United States Patent
Aybay

(10) Patent No.: US 8,144,705 B1
(45) Date of Patent: Mar. 27, 2012

(54) SYSTEMS AND METHODS FOR RECURSIVELY ACCESSING A MULTI-BANK SRAM

(75) Inventor: Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 344 days.

(21) Appl. No.: 12/244,201

(22) Filed: Oct. 2, 2008

Related U.S. Application Data

(63) Continuation-in-part of application No. 12/049,656, filed on Mar. 17, 2008.

(51) Int. Cl.
*H04L 12/28* (2006.01)
*H04L 12/56* (2006.01)

(52) U.S. Cl. ........ 370/389; 370/252; 370/392; 711/100; 711/104

(58) Field of Classification Search ........................ None
See application file for complete search history.

(56) References Cited

U.S. PATENT DOCUMENTS

| | | | | |
|---|---|---|---|---|
| 5,490,258 A * | 2/1996 | Fenner | | 711/1 |
| 5,495,609 A * | 2/1996 | Scott | | 707/696 |
| 5,546,571 A * | 8/1996 | Shan et al. | | 707/999.003 |
| 6,553,370 B1 * | 4/2003 | Andreev et al. | | 707/999.003 |
| 6,564,211 B1 * | 5/2003 | Andreev et al. | | 707/999.003 |
| 6,614,789 B1 * | 9/2003 | Yazdani et al. | | 370/392 |
| 6,658,002 B1 * | 12/2003 | Ross et al. | | 370/392 |
| 6,662,184 B1 * | 12/2003 | Friedberg | | 707/754 |
| 6,717,946 B1 | 4/2004 | Hariguchi et al. | | |
| 6,798,777 B1 * | 9/2004 | Ferguson et al. | | 370/392 |
| 6,859,455 B1 * | 2/2005 | Yazdani et al. | | 370/392 |
| 6,862,281 B1 * | 3/2005 | Chandrasekaran | | 370/392 |
| 7,002,965 B1 * | 2/2006 | Cheriton | | 370/395.32 |
| 7,177,276 B1 * | 2/2007 | Epps et al. | | 370/230 |
| 7,190,696 B1 * | 3/2007 | Manur et al. | | 370/392 |
| 7,516,119 B1 | 4/2009 | Kao | | |
| 2002/0110122 A1 * | 8/2002 | Ramfelt et al. | | 370/389 |
| 2002/0146009 A1 * | 10/2002 | Gupta et al. | | 370/392 |
| 2003/0023711 A1 * | 1/2003 | Parmar et al. | | 709/223 |
| 2003/0037042 A1 * | 2/2003 | Kametani | | 707/3 |
| 2003/0098893 A1 * | 5/2003 | Makinen | | 345/853 |
| 2004/0030802 A1 * | 2/2004 | Eatherton et al. | | 709/245 |
| 2004/0109451 A1 * | 6/2004 | Huang et al. | | 370/392 |
| 2005/0018682 A1 * | 1/2005 | Ferguson et al. | | 370/392 |
| 2005/0083937 A1 * | 4/2005 | Lim | | 370/392 |
| 2005/0165958 A1 * | 7/2005 | Uzawa et al. | | 709/238 |
| 2005/0171959 A1 * | 8/2005 | Deforche et al. | | 707/100 |
| 2005/0232264 A1 * | 10/2005 | Wybenga et al. | | 370/389 |

OTHER PUBLICATIONS

WO 01/63852. Heikkila et al. A Method and Arrangement for Constructing, Maintaining and using Lookup Tables for Packet Routing. International Publication Date Aug. 30, 2001.*

* cited by examiner

*Primary Examiner* — Ayaz Sheikh
*Assistant Examiner* — Peter Chau
(74) *Attorney, Agent, or Firm* — Harrity & Harrity, LLP

(57) ABSTRACT

A device may include multi-bank static random access memory (SRAM) logic that receives multiple addresses from a packet processor, and provides the multiple addresses to multiple SRAMs. The SRAM logic also reads intermediate data and final data from the multiple SRAMs using the provided multiple addresses, provide a next address to the multiple SRAMs for each of the intermediate data, and transmits each of the final data to the packet processor.

16 Claims, 6 Drawing Sheets

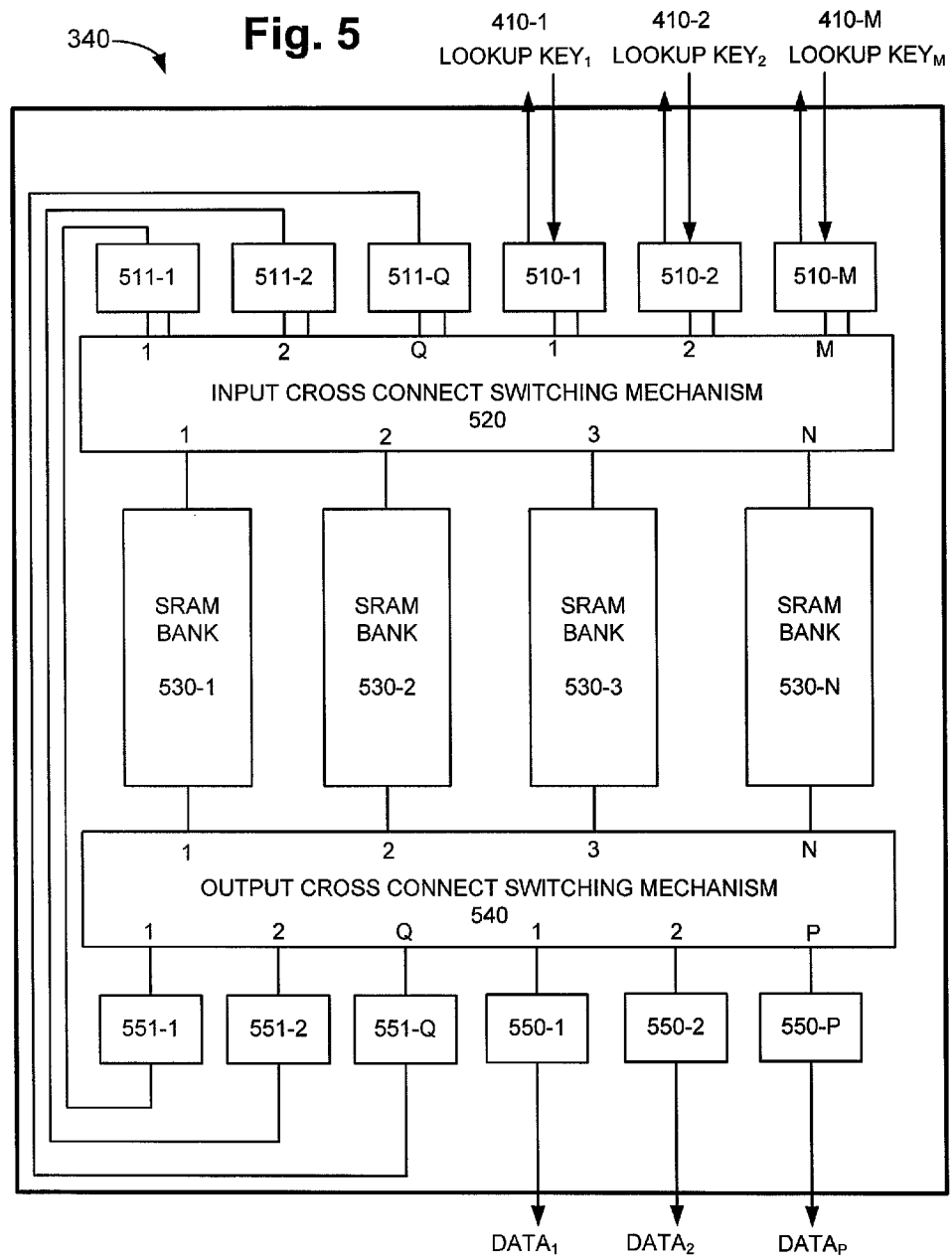

US 8,144,705 B1

SYSTEMS AND METHODS FOR RECURSIVELY ACCESSING A MULTI-BANK SRAM

This application is a continuation-in-part (CIP) of U.S. patent application Ser. No. 12/049,656, filed on Mar. 17, 2008, the contents of which are herein incorporated by reference.

BACKGROUND INFORMATION

Network devices, such as switches or routers, may be used not only to route and/or switch data packets to their destinations, but may also be used to collect information and perform actions on received and/or transmitted data packets. Existing network devices commonly store databases associated with packet processing functions in recursive data structures that must be accessed by a packet forwarding engine in order to determine the action(s) to be performed on a data packet. Access to recursive data structures is iterative and the address of a read transaction depends on the data of the previous read transaction. While processing a packet, the packet forwarding engine typically issues a series of memory read operations to an external memory in which the data structures are stored. The packet forwarding engine has to wait for the data for each read transaction to be returned from the external memory before it can construct the address of the next read transaction to access the next iteration of the data structure or the final set of data that determines the action(s) that need to be performed on that particular packet. In such implementations, multiple memory accesses to external memory devices associated with tracking recursive data structures can add significant amount of latency for each packet to propagate through the network device.

SUMMARY

According to one implementation, a device may include a packet processor for receiving a packet and extracting information from the received packet to form a lookup key; and multi-bank static random access memory (SRAM) logic to: receive the lookup key from the packet processor, where the lookup key includes an address, provide the address to at least one of multiple SRAMs, read data from the at least one of the multiple SRAMs using the provided address, determine if the data is intermediate data or final data, and provide a next address to at least one of the multiple SRAMs when the data is intermediate data and transmit the data to the packet processor when the data is final data.

According to another implementation, a method may include receiving multiple addresses from a packet processor; providing the multiple addresses to multiple static random access memories (SRAMs); reading intermediate data and final data from the multiple SRAMs using the provided multiple addresses; providing a next address to the multiple SRAMs for each of the intermediate data and transmitting each of the final data to the packet processor.

According to still another implementation, a device may include means for receiving multiple addresses from a packet processor; means for providing the multiple addresses to multiple static random access memories (SRAMs); means for determining the type of data read from the multiple SRAMs; means for transmitting a first type of data to the packet processor; and means for generating a next address when the read data is a second type of data.

BRIEF DESCRIPTION OF THE DRAWINGS

The accompanying drawings, which are incorporated in and constitute a part of this specification, illustrate embodiments described herein and, together with the description, explain the embodiments. In the drawings:

FIG. 5 is a block diagram of the exemplary multi-bank SRAM logic of FIG. 3; and

DETAILED DESCRIPTION

The following detailed description refers to the accompanying drawings. The same reference numbers in different drawings may identify the same or similar elements. In addition, while some of the following description is provided mainly in the context of routers or other network elements at layer 2 and/or layer 3 of the Open Systems Interconnection (OSI) Model, the description provided herein may be applied to different types of network devices at different layers of communication (e.g., Multi-protocol label switching (MPLS) routers, Synchronous Optical Network (SONET) add-drop multiplexers, Gigabit Passive Optical network (GPONs) switches, Synchronous Digital Hierarchy (SDH) network elements, etc.).

In implementations described herein, a system may create and update a flow table of statistics based on received packets. The system may also sample received packets. In addition, the system may transmit the information stored in the flow table to an external device for processing and/or analysis. The implementations described herein may also apply to non-packet data (e.g., cells, frames, etc.).

Figure 1:
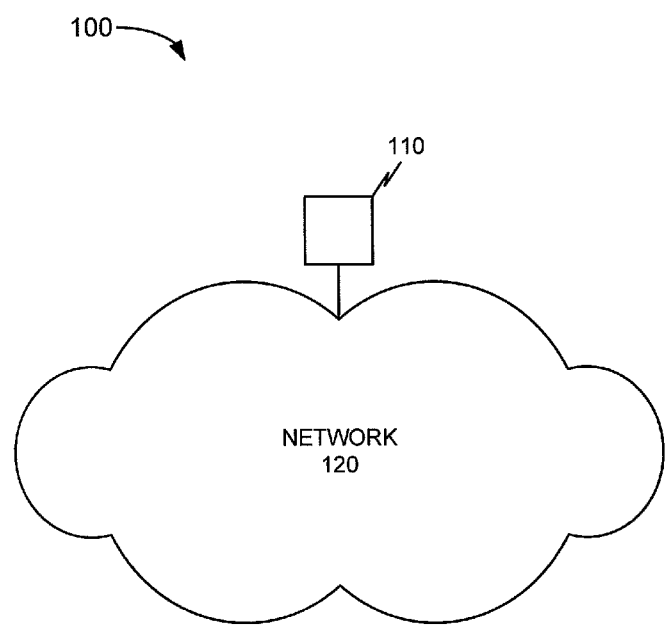
FIG. 1 shows a network in which concepts described herein may be implemented.

FIG. 1 shows an exemplary network in which concepts described herein may be implemented. As shown, network 100 may include a network element 110 and a network 120. In practice, network 100 may include additional elements than those illustrated in FIG. 1. Network element 110 may include a device for performing network-related functions, such as a router or a switch (e.g., a provider edge (PE) router in a MPLS network). Network 120 may include the Internet, an ad hoc network, a local area network (LAN), a wide area network (WAN), a metropolitan area network (MAN), a cellular network, a public switched telephone network (PSTN), any other network, or a combination of networks. Network element 110 may communicate with other network elements (not shown) in network 120 via wired or wireless communication links.

Figure 2:
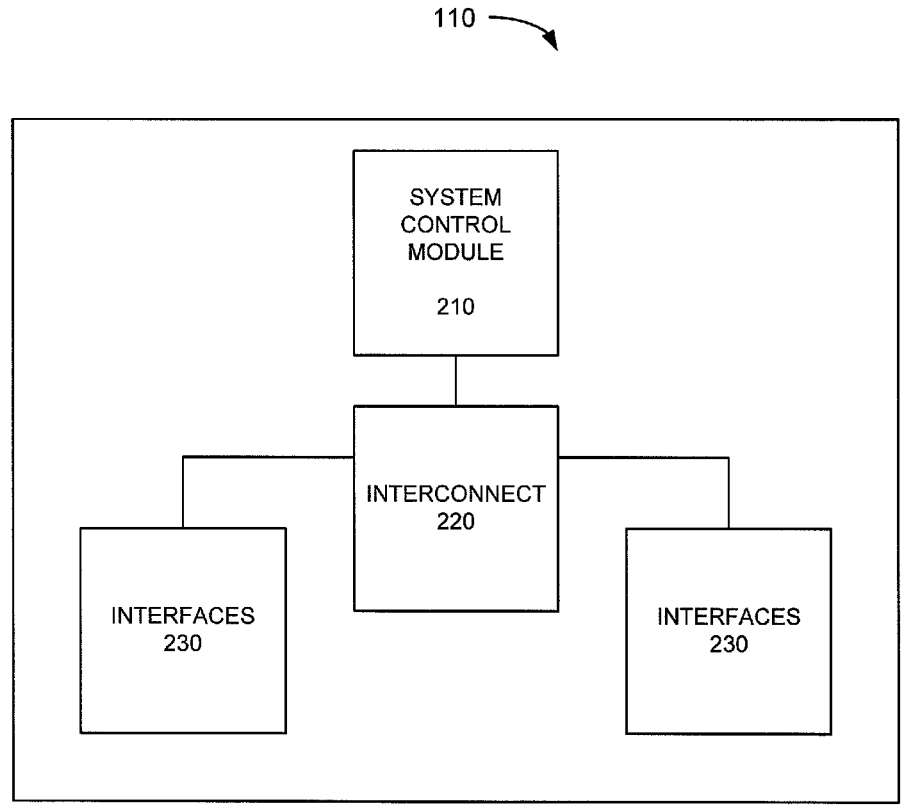
FIG. 2 is a block diagram of an exemplary network element of FIG. 1.

FIG. 2 shows an exemplary block diagram of network element 110. As shown, network element 110 may include a system control module 210, an interconnect 220, and one or more interfaces 230. In other implementations, network element 110 may include fewer, additional, or different components than those illustrated in FIG. 2.

System control module 210 may include one or more processors, microprocessors, application specific integrated circuits (ASICs), field programming gate arrays (FPGAs), and/or processing logic that may be optimized for networking and communications. System control module 210 may perform high level management functions for network element 110. For example, system control module 210 may communicate with other networks and systems connected to network element 110 in order to exchange information regarding network topology. System control module 210 may create routing tables based on network topology information, may create forwarding tables based on the routing tables, and may send these tables to interfaces 230 for data packet routing. System control module 210 may also include a static memory (e.g. a read only memory (ROM)), a dynamic memory (e.g. a random access memory (RAM)), and/or onboard cache, for storing data and machine-readable instructions. System control module 210 may also include storage devices, such as a floppy disk, a CD ROM, a CD read/write (R/W) disc, and/or flash memory, as well as other types of storage devices.

Interconnect 220 may include one or more switches or switch fabrics for directing incoming network traffic, such as data packets, from one or more of interfaces 230 to other interfaces 230. Interconnect 220 may also include processors, memories, and/or paths that permit communication among system control module 210 and interfaces 230.

Interfaces 230 may include devices or assemblies, such as line cards, for receiving incoming data packets from network links and for transmitting data packets to network links. In other examples, interfaces 230 may include Ethernet cards, optical carrier (OC) interfaces and asynchronous transfer mode (ATM) interfaces.

Depending on implementations, the components shown in FIG. 2 may provide fewer or additional functionalities. For example, if network element 110 performs an Internet Protocol (IP) packet routing function as part of a Multi-Protocol Label Switching (MPLS) router, system control module 210 may perform tasks associated with obtaining routing information from other routers in a MPLS network. In such cases, conveying network traffic from one interface to another interface may involve label-based routing, rather than Internet Protocol (IP) address-based routing.

Figure 3:
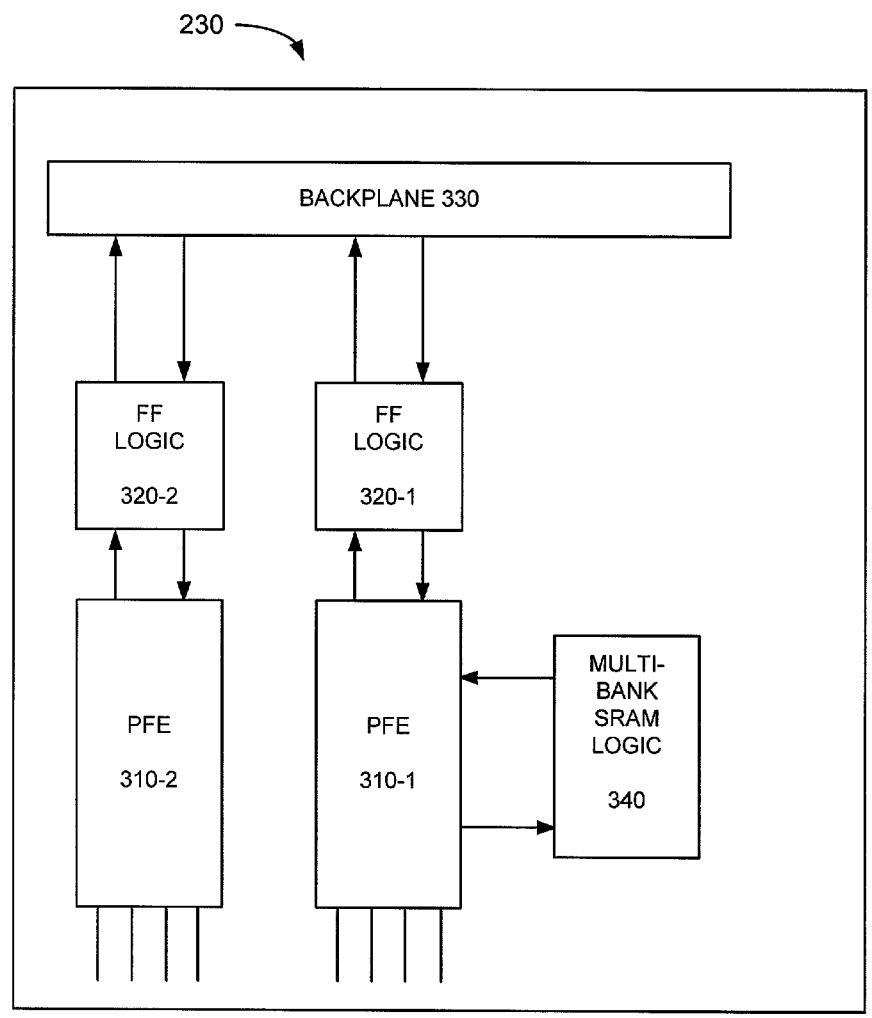
FIG. 3 is a block diagram of an exemplary interface of FIG. 2.

FIG. 3 depicts a block diagram of a single interface 230. Other interfaces 230 may be similarly configured. As shown in FIG. 3, interface 230 may include one or more packet forwarding engines (PFEs) 310-1 and 310-2 (hereinafter collectively referred to as "packet forwarding engines 310" or "PFEs 310," and singularly as "packet forwarding engine 310" or "PFE 310"), one or more fabric and forwarding (FF) logic 320-1 and 320-2 (hereinafter collectively and/or singularly referred to as "FF logic 320"), a backplane 330, and multi-bank static random access memory (SRAM) logic 340. In other implementations, interface 230 may include fewer, additional, or different components than those illustrated in FIG. 3.

PFE 310 may include hardware, software, or a combination of hardware and software for receiving, storing, processing, and/or forwarding data packets. For example, PFE 310 (also be referred to as a "packet processor") may process packets received from an incoming link and may prepare packets for transmission on an outgoing link. PFE 310 may also perform route lookup based on packet header information to determine destination information for the packets. PFE 310 may include one or more memories for storing received data packets. PFE 310 may also transmit received data packets to FF logic 320 for forwarding to backplane 330 based on determined data packet routing information. PFE 310 may create a lookup key for each received data packet based on information included in the data packet header. For example, a lookup key may be created from a five-tuple of information included in a received data packet header. Numerical values in the packet header that relate to the source address, the destination address, the source port, the destination port and/ or the protocol may be added or combined in some manner (e.g., via hashing, etc.) to form a lookup key. The lookup key created by PFE 310 may be transmitted to multi-bank SRAM logic 340 to determine operations and actions to be performed on the received data packet. For example, PFE 310 may perform actions such as, prioritizing, sampling, and/or counting a received data packet based on the information received from multi-bank SRAM logic 340.

FF logic 320 may include hardware, software, or a combination of hardware and software for receiving and storing data packets from PFE 310 and for forwarding received data packets to backplane 330. FF logic 320 may also receive data packets from backplane 330 and may forward the data packets for processing by PFE 310.

Backplane 330 may include a switching fabric and/or memories for transmitting data packets to/from interconnect 220 (as shown in FIG. 2).

Figure 4A:
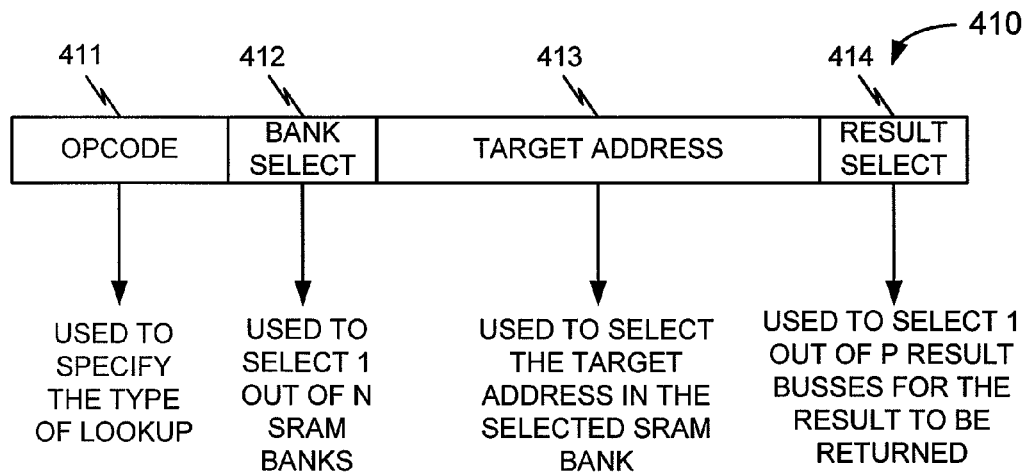
FIGS. 4A-4C illustrate exemplary data structures capable of being processed and stored in exemplary multi-bank SRAM logic of FIG. 3.
Figure 4B:
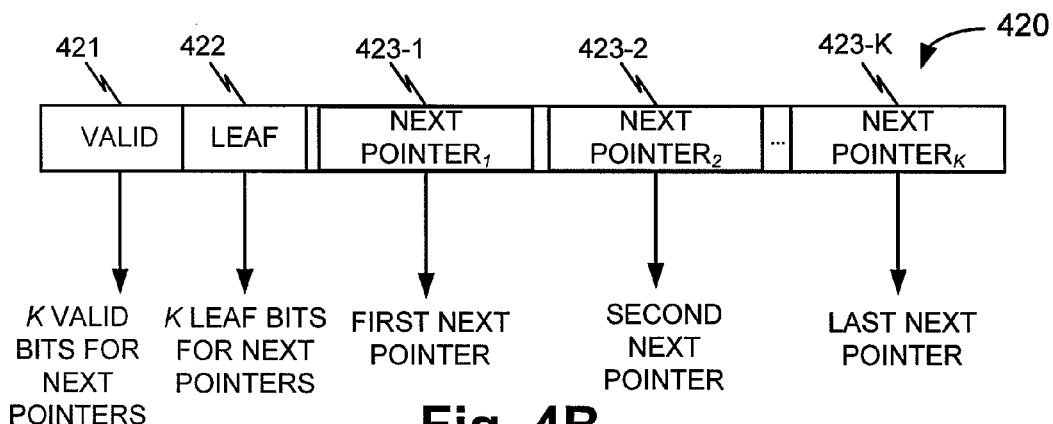
Figure 4C:
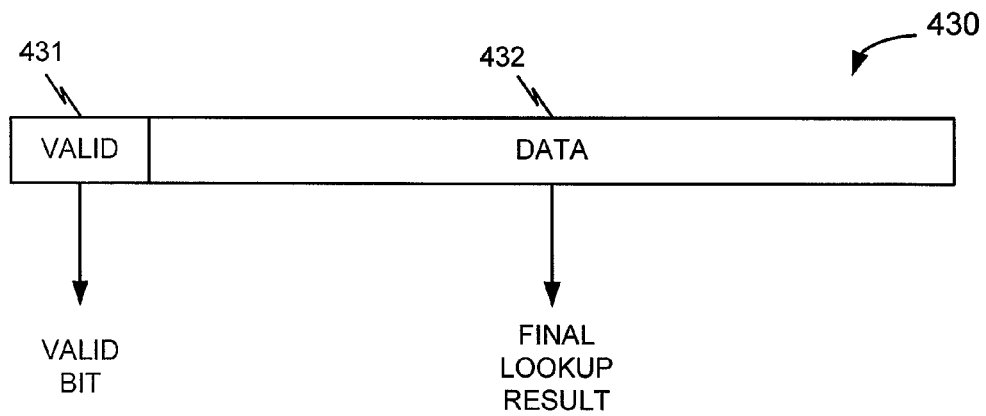

Multi-bank SRAM logic 340 may include one or more SRAM memory banks and hardware, software, firmware, or hardware and software that provides access to the SRAM memory banks. For example, multi-bank SRAM logic 340 may be configured to receive a lookup key from PFE 310 and may simultaneously access (read from memory) a number of SRAM memory banks. If data has been read from the SRAM memory banks, multi-bank SRAM logic 340 may simultaneously transmit the data read from the SRAM memory banks to the requesting PFE 310. Data stored in the SRAM memory banks contained in multi-bank SRAM logic 340 may include information used to identify actions to be taken by PFE 310 on received data packets. Additionally, data stored in the SRAM memory banks contained in multi-bank SRAM logic 340 may be stored as recursive data structures, such as, for example, linked lists or tries. FIGS. 4A-4C describe in more detail exemplary data (lookup keys) transmitted to multi-bank SRAM logic 340 and exemplary data stored within and transmitted from multi-bank SRAM logic 340.

FIG. 4A is a diagram of exemplary data that may be included in a lookup key 410. Lookup key 410 may be transmitted from PFE 310 to multi-bank SRAM logic 340. As shown in FIG. 4A, lookup key 410 may include an operation code field 411, a bank select field 412, a target address field 413, and a result select field 414.

Operation code field 411 may include information used to identify or specify an operation to be performed on a received packet. For example, operation code field 411 may include two or three bits of information used to identify an operation that PFE 310 may perform on a received data packet, such as, prioritizing, sampling and counting a received data packet.

Bank select field 412 may contain information for identifying or select one of a number of SRAM memory banks within multi-bank SRAM logic 340. For example, if there are four SRAM memory banks, bank select field 412 may contain two bits of information used to identify and select one of the four SRAM memory banks.

Target address field 413 may contain an address within an identified SRAM memory bank within multi-bank SRAM logic 340. For example, target address field 413 may contain an 8, 12, 16 or 24 bit address for identifying or selecting a target address within SRAM memory banks.

Result select field 414 may contain information for identifying or selecting one of a number of SRAM result buses within multi-bank SRAM logic 340. For example, if there are four result bus registers, result select field 414 may contain two bits of information used to identify and select one of the four result bus registers.

In other implementations, lookup key 410 may include fewer fields, such as operation code field 411 and target address field 413, where the other fields (e.g., fields 412 and 414) may be created from the two provided fields (e.g., fields 411 and 413) using components described below in connection with to FIG. 5.

FIG. 4B is a diagram of exemplary intermediate data 420 that may be stored in multi-bank SRAM logic 340. As shown, exemplary intermediate data 420 may include a valid field 421, a leaf field 422, and one or more next pointer fields 423-1, ..., 423-K (hereinafter collectively referred to as "next pointer fields 423").

Valid field 421 may include information used to identify a validity of data stored in intermediate data 420. For example, valid field 421 may include two bits, where each of the bits may correspond to and may indicate the validity of a stored next pointer provided in next pointer field 432.

Leaf field 422 may contain information for identifying K number of "leaf" points within a "tree" type recursive data structure. For example, leaf field 422 may include two bits of information used to indicate that there may be up to four next pointer fields 423. For example, a recursive tree data structure may be stored within SRAM memory banks within multi-bank SRAM logic 340.

Each of next pointer fields 423 may contain information, such as a pointer or an address. For example, each of next pointer fields 423 may contain an address or information used to generate an address within a SRAM memory bank. As shown in FIG. 4B, there may be one or more next pointer fields 423 stored in one intermediate data 420.

FIG. 4C is a diagram of exemplary final data 430 that may be stored within and transmitted from SRAM memory banks. As shown, final data 430 may include a valid bit field 431 and a final data field 432.

Valid bit 431 may include one bit of information used to identify the validity of associated final data field 432. In one example, a one bit may indicate that the data stored in final data field 432 is valid.

Final data field 432 may contain bits of information for identifying one or more actions and/or related information (e.g., a final lookup) used by PFE 310 to process a received data packet. For example, the data stored in final data field 432 may identify an action such as prioritizing, sampling or counting a received data packet.

Multi-bank SRAM logic 340 may process the data structures depicted in FIGS. 4A-4C as described below in connection with FIG. 5.

FIG. 5 shows a functional block diagram of exemplary multi-bank SRAM logic 340. As shown, multi-bank SRAM 340 logic may include one or more address parsers 510-1 to 510-M (hereinafter collectively referred to as "address parsers 510"), one or more intermediate address parsers 511-1 to 511-Q (hereinafter collectively referred to as "intermediate address parsers 511"), an input cross connect switching mechanism 520, one or more SRAM memory banks 530-1 to 530-N (hereinafter collectively referred to as "SRAM memory banks 530"), an output cross connect switching mechanism 540, one or more result bus registers 550-1 to 550-P (hereinafter collectively referred to as "result bus registers 550"), and one or more intermediate result bus registers 551-1 to 551-Q (hereinafter collectively referred to as "intermediate result bus registers 551"). In other implementations, multi-bank SRAM 340 logic may include fewer, additional, or different components than those illustrated in FIG. 5. Furthermore, the number of address parsers 510, intermediate address parsers 511, SRAM banks 530, result bus registers 550, and intermediate result bus registers 551 depicted in FIG. 5 is exemplary, and different numbers address parsers 510, intermediate address parsers 511, SRAM banks 530, result bus registers 550, and/or intermediate result bus registers 551 may be provided in other implementations.

PFE 310 may connect to multi-bank SRAM logic 340 via a one bus connection, a two bus connection, or a four bus connection. Furthermore, the number of address parsers 510 may be more than four. Assuming that there are four address parsers 510 (e.g., M=4) and that there is a one bus connection between PFE 310 and multi-bank SRAM logic 340, each of the four address parsers 510-1 to 510-4 may receive a corresponding lookup key 410 via communication with the one bus connection. If there is a two bus connection between PFE 310 and multi-bank SRAM logic 340, the first bus may connect to address parsers 510-1 and 510-2 and the second bus may connect to address parsers 510-3 and 510-4. If there is a four bus connection between PFE 310 and multi-bank SRAM logic 340, each of the four buses may connect to one of address parsers 510-1 to 510-4. When using a one or two bus connection in the above examples, time-division multiplexing (TDM) techniques may be used to transmit four or two data words (e.g., information provided in fields 411-414) in one operation. Furthermore, more than one PFE 310 may connect to multi-bank SRAM logic 340. For example, four PFEs 310 (310-1 to 310-4) may connect to multi-bank SRAM logic 340, where each PFE 310 may connect to a single address parser 510 (via a separate bus connection) within multi-bank SRAM logic 340.

Address parsers 510 may include hardware, software, or a combination of hardware and software for receiving and storing one or more lookup results from PFE 310. Address parsers 510 may include additional hardware and/or firmware for performing arithmetic and logic operations on lookup keys 410 received from PFE 310 to generate one or more results that may be passed to one or more SRAM banks 530 through input cross connect mechanism 520. For example, lookup key 410 may include information in fields 411-414 as shown in FIG. 4A. As described above, if there is a four bus connection between PFE 310 and multi-bank SRAM logic 340, each of the four buses may connect to one of address parsers 510-1 to 510-4. In another example, if there is a two bus connection between PFE 310 and multi-bank SRAM logic 340, address parsers 510-1 and 510-2 may receive two lookup keys 410-1 and 410-2 via a first bus and address parsers 510-3 and 510-4 may receive two lookup keys 410-3 and 410-4 via a second bus. In this example, address parser 510-1 may parse or ignore lookup 410-2, and may store lookup key 410-1. Similarly, address parser 510-2 may parse or ignore lookup key 410-1 and may store lookup key 410-2.

In still another example, if there is a one bus connection between PFE 310 and multi-bank SRAM logic 340, each address parser 510 may receive four lookup keys 410-1 to 410-4. In this example, each address parser 510 may parse or ignore three lookup keys 410 and may store the information in one lookup key 410. For example, address parser 510-1 may ignore information in lookup keys 410-2 to 410-4 and may store lookup key 410-1, and address parser 510-2 may ignore information in three lookup keys (410-1, 410-3, and 410-4) and may store information in lookup key 410-2. Similarly, address parser 510-3 may ignore information in three lookup keys (410-1, 410-2, and 410-4) and may store information in lookup key 410-3, and address parser 510-4 may ignore information in three lookup keys (410-1, 410-2, and 410-3) and store information in lookup key 410-4. In all the above examples regarding the number of bus connections between PFEs 310 and multi-bank SRAM logic 340, address parsers 510 may be configured to transmit a busy signal (i.e., currently not capable of receiving an processing a lookup key 410) to PFE 310 when currently processing an address. If address parser 510 is not transmitting a busy signal, PFE 310 may transmit a lookup key 410.

In other implementations, address parsers 510 may perform arithmetic and/or logical operations on data within fields 412 to 414, and/or may create and supply more than one address to SRAM banks 530. For example, address parser 510-1 may send information in target address field 413 without any modifications to SRAM bank 530-1 such that an address (e.g., provided in target address field 413) received from PFE 310 may be used as a direct lookup address for data in SRAM bank 530-1. Simultaneously, address parser 510-1 may add a fixed offset to target address field 413 and may pass a resulting new address as the lookup address for data in SRAM bank 530-2.

In still further examples, address parsers 510 may left shift bits of information in a received target address based on sizes of data structures stored in SRAM banks 530. For example, SRAM banks 530 may store 8 bytes of information at each addressable entry or may store 32 bytes of information at each addressable entry. Based on the sizes of the data stored in SRAM banks 530, address parsers 510 may left shift received bits as necessary to accommodate varying sizes of the stored data structures. In all the above examples, address parsers 510 may output fields 412-414 to be processed by the components described below.

Intermediate address parsers 511 may include hardware, software, or a combination of hardware and software for receiving and storing one or more intermediate data results from intermediate result bus registers 551. For example, intermediate address parsers 511 may receive information stored in next pointer field 423 and may pass this information to input cross connect mechanism 520. The information may be used to read data from an address in one of SRAM banks 530. Intermediate address parsers 511 may include additional hardware and/or firmware to perform arithmetic and logic operations on received data. For example, intermediate address parsers 511 may left shift bits of information in a received next pointer field 423 received as intermediate data from intermediate result bus registers 551.

Input cross connect switching mechanism 520 may include hardware, software, or a combination of hardware and software that may interconnect address parsers 510 with SRAM memory banks 530. For example, input cross connect switching mechanism 520 may include one or more input ports (equal to the number of address parsers 510), where each input port may receive information included in bank select field 412, target address field 413, and result select field 414. Input cross connect switching mechanism 520 may use information in bank select field 412 to connect received information in an input port to a selected SRAM memory bank 530 via an output port. For example, a first input port of input cross connect switching mechanism 520 may transmit received information (included in fields 412 to 414) to a second output port of input cross connect switching mechanism 520 when information in bank select field 412 identifies SRAM 530-2. Input cross connect switching mechanism 520 may be implemented using many different techniques. For example, input cross connect switching mechanism 520 may include busses, crossbars, and/or shared memories. In these implementations, input cross connect switching mechanism 520 may provide multiple simultaneous data paths to interconnect address parsers 510 with SRAM memory banks 530. Input cross connect switching mechanism 520 may also be programmed and/or configured by system control module 210 to statistically assign address information received from address parser 510 to a specific SRAM bank 530. Input cross connect switching mechanism 520 may also be further programmed and/or configured to send a signal to address parsers 510 and to intermediate address parsers 511, the signal indicating that input cross connect switching mechanism 520 can not currently receive an address as it is currently processing an address. If input cross connect switching mechanism 520 is not transmitting this signal, it may receive address information from address parsers 510 and intermediate address parsers 511.

In one implementation, each of SRAM banks 530 may include an addressable memory. For example, SRAM memory banks 530 may receive an address (included in target address field 413) and may read stored data from the received address. SRAM memory banks 530 may store data as intermediate data 420 and as final data 430. SRAM memory banks 530 may also be configured to access or read first fields of bits (e.g., fields 421, 422 or 431) to determine if the stored data at an address is one of intermediate data 420 or final data 430. SRAM memory banks 530 may output the data from the received address to output cross connection switching mechanism 540 based on the determination of the type of data (i.e., intermediate or final) to be sent to either one of result parsers 550 or intermediate result bus registers 551. Data stored in SRAM memory banks 530 may be used by PFE 310 to identify an action to be taken on a received data packet.

Output cross connect switching mechanism 540 may include hardware, software, or a combination of hardware and software that may receive information from SRAM memory banks 530 and may transmit the received information to result bus registers 550 and intermediate result bus registers 551. For example, output cross connect switching mechanism 540 may include N number of input ports (equal to the number of SRAM banks 530), where each input port receives information, such as data read from an address within a SRAM bank 530, and a result select field 414. Output cross connect switching mechanism 540 may use information in result select field 414 to connect received information in an input port to a selected result bus register 550, via an output port. For example, a first input port of output cross connect switching mechanism 540 may transmit received information to a second output port of output cross connect switching mechanism 540, when information in result select field 414 identifies result bus register 550-2. Output cross connect switching mechanism 540 may use intermediate data 420 stored in SRAM banks 530 to transmit information received in an input port to a selected intermediate result bus register 551, via an output port. Output cross connect switching mechanism 540 may be implemented using many different techniques. For example, output cross connect switching mechanism 540 may include busses, crossbars, and/or shared memories. In these implementations, output cross connect switching mechanism 540 may provide multiple simultaneous data paths to interconnect SRAM banks 530 with result bus registers 550 and intermediate result bus registers 551. Output cross connect switching mechanism 540 may also be programmed and/or configured by system control module 210 to statistically assign information received input from a SRAM bank 530 to a specific result bus register 550 and/or a specific intermediate result bus register 551.

Result bus registers 550 may include hardware, software, or a combination of hardware and software to receive, store, and process information for transmission to PFE 310, via a corresponding data bus. For example, result bus register 550-1 may receive information read from an address in SRAM bank 530-2 and may transmit this information via a data bus to PFE 310. The information transmitted from result bus registers 550 in multi-bank SRAM logic 340 may also include a valid bit (such as stored in field 431) and may be transmitted to PFE 310 in a number of ways. For example, multi-bank SRAM logic 340 may be connected to PFE 310 via a one bus connection, a two bus connection, or a four bus connection. Assuming that there are four result bus registers 550 (identified as 550-1 to 550-4) and there is a one bus connection between multi-bank SRAM logic 340 and PFE 310, each of the four result bus registers 550-1 to 550-4 may transmit read data via the one bus connection. If there is a two bus connection between multi-bank SRAM logic 340 and PFE 310, the first bus may transmit data from result bus registers 550-1 and 550-2 and the second bus may transmit information from result bus registers 550-3 and 550-4. If there is a four bus connection between multi-bank SRAM logic 340 and PFE 310, each of the four buses may connect to only one of result bus registers 550. When using a one or two bus connection in the above examples, time-division multiplexing (TDM) techniques may be used to transmit four or two read data words in one operation. In other examples, there may be a number of PFEs 310 connected to multi-bank SRAM logic 340. In this example, each result bus register 550 may connect to a PFE 310.

Intermediate result bus registers 551 may include hardware, software, or a combination of hardware and software to receive, store, and process information received from output cross connect switching mechanism 540 for transmission to intermediate address parsers 511. For example, intermediate result bus register 551-1 may receive information from output cross connect switching mechanism 540 (such as information stored in next pointer field 423 read from an address in SRAM bank 530-2), and may transmit this information to intermediate address parser 511-1.

Figure 6:
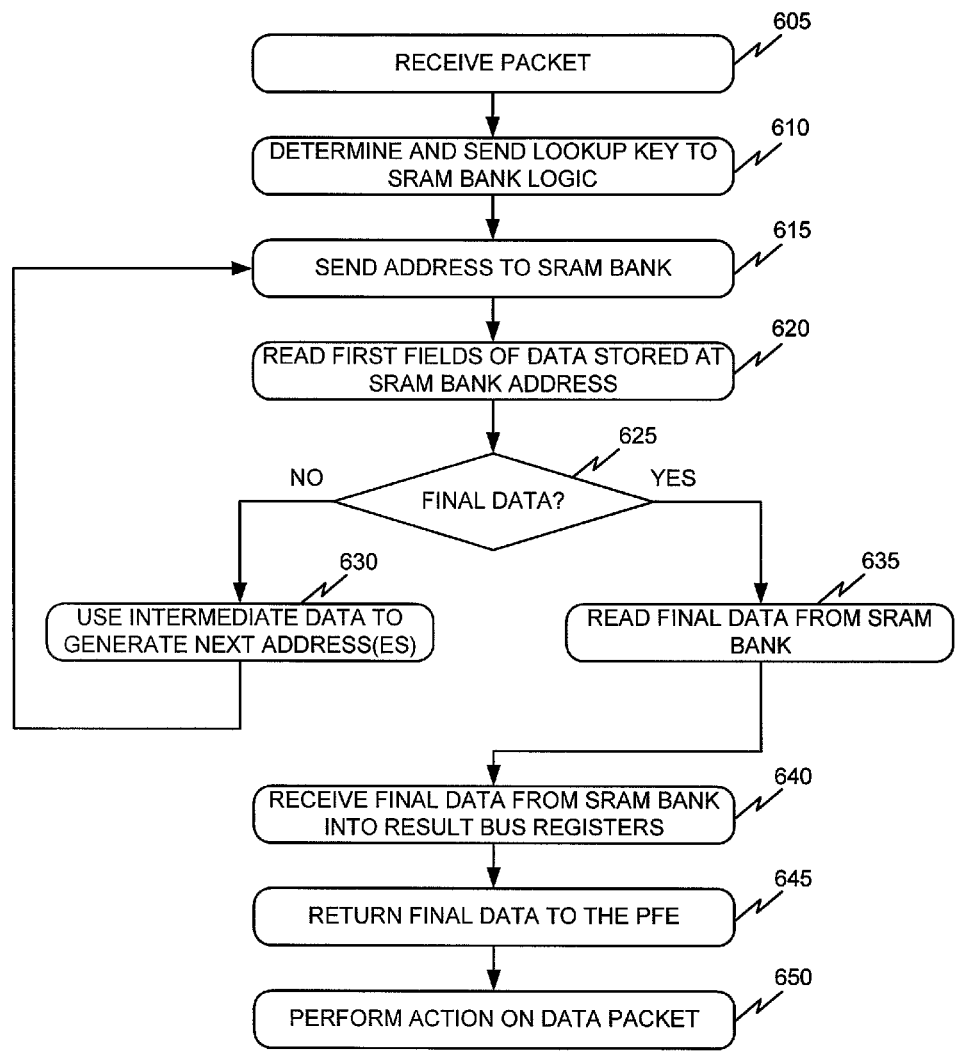
FIG. 6 is a flowchart of an exemplary multi-bank SRAM reading process according to implementations described herein.

FIG. 6 shows an exemplary multi-bank SRAM reading process 600. Process 600 may begin with receipt of a data packet (block 605). As described above for example, PFE 310 may receive a data packet via an incoming link or from FF logic 320. After receiving a packet, PFE 310 may parse or extract information from the packet header to determine a lookup key and may send the lookup key to multi-bank SRAM logic 340 (block 610). As described above for example, a number of lookup keys 410 may be stored in a table provided within PFE 310, where each lookup key 410 may be associated with a five-tuple of information. PFE 310 may compare the received five-tuple of information in the currently received packet to stored five-tuples of information in order to determine the associated lookup key 410. The lookup key may be provided from PFE 310 to multi-bank SRAM logic 340 (block 610). As described above, there may be M number of incoming connections to multi-bank SRAM logic 340. In one example, there may be one PFE 310 connected to multi-bank SRAM logic 340 via a one, two or four bus connection, where PFE 310 may transmit M number of lookup keys 410 and each lookup key 410 may be associated with a packet from one of the M number of different data streams. In another example, there may be M number of PFEs 310 where each PFE 310 transmits one lookup key 410, via one of the M number of connections, to multi-bank SRAM logic 340. In both examples, the M number of lookup keys 410 may be simultaneously received and processed by multi-bank SRAM logic 340.

Using a received lookup key 410, multi-bank SRAM logic 340 may use information included in the received lookup key 410 to send an address to one of SRAM banks 530 (block 615). As shown in FIG. 4A, for example, a received lookup key 410 may include fields 411 to 414. Address parser 510-1 may use information received in bank select field 412, which may indicate that SRAM bank 530-2 should receive the associated target address 413. Input cross connect switching mechanism 520 may send the target address (stored in target address field 413) to the selected SRAM bank 530-2. For example, input cross connect switching mechanism 520 may send target address 413 (received at input port 1 from address parser 510-1) to SRAM bank 530-2, via output port 2. In a similar manner, input cross connect switching mechanism 520 may simultaneously send other target addresses 413 (received at other input ports from other address parsers 510) to other identified SRAM banks 530, via the appropriate output ports.

Using a received target address, SRAM bank 530 may read the first fields of bits stored at the address (block 620). As shown in FIGS. 4B and 4C, both intermediate data 420 and final data 430 may be stored in SRAM banks 530. When final data 430 is stored at the received address, SRAM bank 530 may process the first single bit (stored in valid bit field 431) to determine that the stored data is final data 430 (block 625—YES). When intermediate data 420 is stored at the received address, SRAM bank 530 may process the first bit fields (stored in valid field 421 and leaf field 422) to determine that the stored data is intermediate data 420 (block 625—NO).

If intermediate data 420 is stored at the received address, SRAM bank 530 may send the data stored in next pointer fields 423 to intermediate result bus registers 551. As shown in FIG. 5, for example, output cross connect switching mechanism 540 may receive next pointer information in port 3 (received from SRAM bank 530-3), and may send this next pointer information to intermediate result bus register 551-2. Intermediate result bus register 551-2 may send the next pointer information to intermediate address parser 511-2. Intermediate address parsers 511 may use the received next pointer information as an address or intermediate address parsers 511 may perform operations, such as a shifting or adding of bits, on the received next pointer information to generate a next address to be sent to SRAM banks 530 (block 630).

Once a next address has been generated, intermediate address parsers 511 may send the next address to the SRAM banks 530 (block 615). Upon receiving this next address, SRAM banks 530 may again perform blocks 620 and 625. It should be understood that blocks 615 to 630 may be performed any number of times until final data is determined (block 625—YES).

Once it is determined that final data 430 is stored at the received address, the data may be read from SRAM banks (block 635). For example, data stored within SRAM bank 530-1 may be read and transmitted to output cross connect switching mechanism 540, via port 3.

After data has been read from each SRAM bank 530, the results may be returned to result bus registers (block 640). For example, using information included in result bus field 414, output cross connect switching mechanism 540 may send the read data from SRAM bank 530 to an identified result bus register 550. Information in result select field 414 may identify result bus register 550-1, where output cross connect switching mechanism 540 may send the read data from SRAM bank 530-2 to result bus register 550-1. After read data has been received by each result bus register 550, the data may be transmitted to PFE 310 (block 645). As described above for example, the data may be transmitted from result bus registers 550 to PFE 310-1 via four individual buses or may be time division multiplexed over one or two buses. In other examples, if there are four PFEs 310 connected to multi-bank SRAM logic 340, each PFE 310 may receive result data 432 from one of result bus registers 550. PFE 310 may use the received data to determine and perform actions to be taken on received data packets (block 650). As described above, the actions that PFE 310 may perform on a received data packet may include sampling the data packet, counting the data packet, and prioritizing the data packet.

Implementations described herein may allow for multiple read operations to be performed in a recursive data structure stored within a SRAM. By requiring only one lookup key to be transmitted from the packet processing engine to initiate the recursive read operations within the SRAM, wait times may be reduced and packet processing may be more efficiently performed. The foregoing description of implementations provides an illustration, but is not intended to be exhaustive or to limit the implementations to the precise form disclosed. Modifications and variations are possible in light of the above teachings or may be acquired from practice of the teachings.

For example, while a series of blocks has been described with regard to the process illustrated in FIG. 6, the order of the blocks may be modified in other implementations. Further, non-dependent blocks may represent blocks that can be performed in parallel. For example, blocks 605-650 that are performed for a first data packet may be independent of blocks 605-650 for a second data packet and, therefore, may be performed in parallel with blocks 605-650 for the second data packet. Further, it may be possible to omit blocks within a process.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a packet processor to:
      receive a packet, and
      process the packet to extract information from the packet to form a lookup key;
   and a multi-bank static random access memory (SRAM) processor to:
      receive the lookup key from the packet processor, where the lookup key includes a first address associated with a plurality of SRAMs,
      provide the first address to at least one of the plurality of SRAMs that store a recursive tree data structure, where access to the recursive tree data structure is iterative, and a memory address, corresponding to a first read transaction associated with the recursive tree data structure, depends on data acquired during a second read transaction, associated with the recursive tree data structure, that occurred prior to the first read transaction,
      read first data, from the at least one of the plurality of SRAMs, using the first address,
      determine that the first data is intermediate data that includes information associated with a plurality of next addresses in the recursive tree data structure,
      provide the plurality of next addresses to one or more of the plurality of SRAMs in response to determining that the first data is intermediate data, where the multi-bank SRAM processor, when providing the plurality of next addresses, is further to:
         determine, based on a particular field in the first data, points in the recursive tree data structure, and
         generate the plurality of next addresses using the first data, where the plurality of next addresses are associated, respectively, with the determined points in the recursive tree data structure,
      read second data from the one or more of the plurality of SRAMs using the plurality of next addresses, and
      transmit the second data to the packet processor in response to determining that the second data includes final data that does not include information associated with another address related to the recursive tree data structure.

2. The device of claim 1, where the multi-bank SRAM processor, when providing the plurality of next addresses, is further to:
   generate the plurality of next addresses by shifting bits or adding bits to information included in the first data.

3. The device of claim 1, where the multi-bank SRAM processor, when determining that the first data is intermediate data, is further to:
   read a first field of bits stored in the first address.

4. The device of claim 1, where the lookup key further includes:
   a bank select field, and
   a result select field.

5. The device of claim 4, where the multi-bank SRAM processor, when providing the first address to the at least one of the plurality of SRAMs, is further to:
   provide the first address to the at least one of the plurality of SRAMs based on a value contained in the bank select field.

6. The device of claim 5, where the multi-bank SRAM processor, when transmitting the second data to the packet processor, is further to:
   transmit the second data based on a value contained in the result select field.

7. The device of claim 1, where the packet processor is further to:
   determine, based on the second data, an action to perform on the packet.

8. The device of claim 7, where the determined action to perform on the packet includes at least one of incrementing a count value based on the packet, sampling the packet, or prioritizing the packet relative to other packets.

9. A method comprising:
   receiving a plurality of addresses from a packet processor;
   providing the plurality of addresses to a plurality of static random access memories (SRAMs) that store a recursive tree data structure, where access to the recursive tree data structure is iterative, and a memory address, corresponding to a first read transaction associated with the recursive tree data structure, depends on data acquired during a second read transaction, associated with the recursive tree data structure, that occurred prior to the first read transaction;

reading, in parallel, a plurality of intermediate data and a plurality of final data from the plurality of SRAMs using the provided plurality of addresses, where each one, of the plurality of intermediate data, includes information related to a plurality of next addresses associated with the recursive tree data structure;

providing the plurality of next addresses to the plurality of SRAMs for each of the plurality of intermediate data, where providing the plurality of next addresses includes:
  determining, based on a particular field in the intermediate data, points in the recursive tree data structure, and
  generating the plurality of next addresses using the intermediate data, where the plurality of next addresses are associated, respectively, with the determined points in the recursive tree data structure; and transmitting each of the plurality of final data to the packet processor.

10. The method of claim 9, further comprising:
generating the plurality of next addresses, from the plurality of intermediate data, by adding bits to information stored in the plurality of intermediate data.

11. The method of claim 9, further comprising:
receiving a bank select field associated with one of the received plurality of addresses.

12. The method of claim 11, further comprising:
selecting one of the plurality of SRAMs based on a value obtained from the bank select field, and
providing the one of the received plurality of addresses to the selected one of the plurality of SRAMs.

13. A non-transitory computer readable medium for storing instructions executable by a device, the instructions comprising:
instructions for receiving a plurality of addresses from a packet processor;
instructions for providing the plurality of addresses to a plurality of static random access memories (SRAMs), where the plurality of SRAMs store a recursive tree data structure, where access to the recursive tree data structure is iterative, and a memory address, corresponding to a first read transaction associated with the recursive tree data structure, depends on data acquired during a second read transaction, associated with the recursive tree data structure, that occurred prior to the first read transaction;
instructions for reading, in parallel, data from the plurality of SRAMs based on providing the plurality of addresses;
instructions for determining types of the data read from the plurality of SRAMs, where a second type of data includes information related to a plurality of next addresses associated with the recursive tree data structure;
instructions for transmitting a first type of data to the packet processor; and
instructions for generating the plurality of next addresses when the data is the second type of data, where the instructions for generating the plurality of next addresses include:
  instructions for determining, based on a particular field in the second type of data, points in the recursive tree data structure, and
  instructions for generating the plurality of next addresses using the second type of data, where the plurality of next addresses are associated, respectively, with the determined points in the recursive tree data structure.

14. The computer readable medium of claim 13, further comprising:
instructions for providing the plurality of next addresses to the plurality of SRAMs.

15. The computer readable medium of claim 13, where the instructions for generating the plurality of next addresses further comprise:
instructions for adding bits to respective information included in the second type of data.

16. The computer readable medium of claim 13, where the first type of data transmitted to the packet processor determines an action to be performed on a data packet associated with the first type of data.

* * * * *